United States Patent [19]

Denzinger et al.

[11] Patent Number: 5,073,269
[45] Date of Patent: Dec. 17, 1991

[54] PREPARATION OF WATER-SOLUBLE COPOLYMERS OF MALEIC ACID AND USE THEREOF AS WATER TREATMENT AGENTS

[75] Inventors: Walter Denzinger, Speyer; Heinrich Hartmann, Limburgerhof; Ulrich Goeckel, Boehl-Iggelheim; Felix Richter, Bruehl; Hans-Juergen Raubenheimer, Ketsch; Ekhard Winkler, Mutterstadt, all of Fed. Rep. of Germany

[73] Assignee: BASF Corporation, Parsippany, N.J.

[21] Appl. No.: 529,772

[22] Filed: May 25, 1990

Related U.S. Application Data

[63] Continuation of Ser. No. 140,983, Jan. 5, 1988, abandoned.

[30] Foreign Application Priority Data

Jan. 10, 1987 [DE] Fed. Rep. of Germany ....... 3700535

[51] Int. Cl.$^5$ ............................ C02F 1/00; C08F 4/28
[52] U.S. Cl. ..................................... 210/698; 526/227
[58] Field of Search ........................ 526/227; 210/698

[56] References Cited

U.S. PATENT DOCUMENTS

| | | | |
|---|---|---|---|
| 3,404,135 | 10/1968 | Tietz | 526/227 |
| 3,423,373 | 1/1969 | Verdol et al. | 526/227 |
| 3,514,419 | 5/1970 | Darlow et al. | 526/227 |
| 3,632,561 | 1/1972 | Gibb et al. | 526/227 |
| 3,755,264 | 8/1973 | Testa | 526/86 |
| 3,810,834 | 5/1974 | Jones et al. | 210/698 |
| 3,838,113 | 9/1974 | Smallman | 526/227 |
| 4,126,549 | 11/1978 | Jones et al. | 210/58 |
| 4,202,955 | 5/1980 | Gaylord | 526/272 |
| 4,209,398 | 6/1980 | Ii et al. | 422/17 |
| 4,212,788 | 7/1986 | Birrell et al. | 526/271 |
| 4,253,968 | 3/1987 | Eastman | 526/227 |
| 4,522,992 | 6/1985 | Verbrugge | 526/272 |

FOREIGN PATENT DOCUMENTS

| | | | |
|---|---|---|---|
| 1198067 | 7/1962 | Fed. Rep. of Germany | 526/227 |
| 2137105 | 2/1973 | Fed. Rep. of Germany | 526/227 |
| 0151453 | 10/1981 | Fed. Rep. of Germany | 526/227 |
| 54-160487 | 12/1979 | Japan | 526/227 |
| 57-44604 | 3/1982 | Japan | 526/227 |
| 436830 | 4/1972 | U.S.S.R. | 526/227 |

Primary Examiner—Joseph L. Schofer
Assistant Examiner—N. Sarofim

[57] ABSTRACT

Water-soluble copolymers of maleic acid useful as water treatment agents are prepared by copolymerizing
(a) from 99 to 80% by weight of maleic anhydride and
(b) from 1 to 20% by weight of a monoethylenically unsaturated monomer copolymerizable therewith and, facultatively,
(c) up to 10% by weight of a crosslinker, at from 60° to 200° C. in an aromatic hydrocarbon in the presence of peroxyesters derived from saturated or monoethylenically unsaturated carboxylic acids, and hydrolyzing the anhydride groups of the copolymers following the polymerization.

4 Claims, No Drawings

PREPARATION OF WATER-SOLUBLE COPOLYMERS OF MALEIC ACID AND USE THEREOF AS WATER TREATMENT AGENTS

This is a continuation of copending application Ser. No. 07/140,983 filed on Jan. 5, 1988 now abandoned.

U.S. Pat. No. 3,810,834 discloses using hydrolyzed polymaleic anhydrides having a molecular weight from 300 to 5,000 prior to hydrolysis or water-soluble salts thereof in water treatment, thereby reducing and in many cases virtually preventing scale formation. The polymers suitable for this purpose are prepared by polymerizing maleic anhydride in toluene using benzoyl peroxide and subsequently hydrolysing the resulting polymaleic anhydride. Since the polymerization of maleic anhydride is not complete and the removal of unpolymerized maleic anhydride from the polymer is difficult, the polymaleic acids contain substantial amounts of maleic acid.

U.S. Pat. No. 3,755,264 discloses low molecular weight copolymers containing, as copolymerized units, from 85 to 99 mol % of maleic anhydride and, to make up to 100 mol %, acrylic acid, vinyl acetate, styrene or mixtures thereof. The copolymers are prepared by copolymerizing maleic anhydride with the monomers mentioned in dry organic solvents at from 100° to 145° C. in the presence of peroxides. Suitable peroxides are for example di-tert-butyl peroxide, acetyl peroxide, dicumyl peroxide, diisopropyl percarbonate and in particular benzoyl peroxide. After the polymerization the anhydride groups of the copolymer can be hydrolyzed to acid groups or converted into salts. The water-soluble copolymers are used for preventing scale deposition. The disadvantage of this process is that the copolymerization products have a very high unpolymerized maleic anhydride content.

U.S. Pat. No. 4,209,398 discloses water treatment agents based on copolymers of maleic acid, acrylic acid and 2-hdyroxyethyl methacrylate. As tests have shown, polymers of the composition specified in this reference are only sparingly water-soluble.

It is an object of the present invention to provide a process for preparing a water-soluble copolymer of maleic acid where the free maleic acid content is significantly below the maleic acid content of existing maleic acid copolymers obtainable by copolymerizing maleic anhydride with ethylenically unsaturated monomers and hydrolysis. It is a further object of the present invention to provide a product for reducing scale or water hardness deposits in water-conducting systems which is more effective than copolymers used hitherto.

We have found that these objects are achieved with a process for preparing a water-soluble copolymer of maleic acid by copolymerizing (a) from 99 to 80% by weight of maleic anhydride and
(b) from 1 to 20% by weight of a monoethylenically unsaturated monomer copolymerizable therewith, the percentages (a) and (b) always adding up to 100, at from 60° to 200° C. in an aromatic hydrocarbon in the presence of from 1 to 20% by weight, based on the monomers (a) and (b), of a polymerization initiator, and hydrolyzing the anhydride groups of the copolymer, if the polymerization initiator used is a peroxyester derived from a saturated or monoethylenically unsaturated carboxylic acid. The copolymerization of monomers (a) and (b) may be carried out in the presence of (c) up to 10% by weight of a crosslinker containing not less than 2 ethylenically unsaturated double bonds, in which case the percentages (a), (b) and (c) always add up to 100. The water-soluble copolymer obtainable by the above described process, which may contain crosslinking, is used as a water treatment agent for reducing scale and water hardness deposits in water-conducting systems. The water-soluble copolymer of maleic acid is obtained by copolymerizing (a) from 99 to 80, preferably from 98 to 90, % by weight of maleic anhydride in the presence of from 1 to 20% by weight of a monoethylenically unsaturated monomer copolymerizable therewith in an aromatic hydrocarbon or in a mixture of aromatic hydrocarbons. Suitable aromatic hydrocarbons are for example benzene, toluene, xylene, ethylbenzene, o-, m- and p-diethylbenzene, isopropylbenzene, n-propylbenzene, p-diisopropylbenzene and Tetralin. The isomers of xylene, viz. o-, m- and p-xylene, can be used either in the pure form or the form of the isomer mixtures which are commercially available as technical-grade xylene. Preferably, the aromatic hydrocarbons used are toluene and o-xylene. Up to 40% by weight of the aromatic hydrocarbons can be replaced by aliphatic hydrocarbons. Suitable aliphatic hydrocarbons are for example n-hexane, cyclohexane, n-heptane, n-octane, isooctane, decane and mixtures thereof. Particularly effective copolymers for water treatment, however, are prepared in the absence of aliphatic hydrocarbons, solely in the presence of aromatic solvents.

In the copolymerization of maleic anhydride by the process according to the invention, any monoethylenically unsaturated monomer copolymerizable with maleic anhydride can be used. Particularly effective water treatment agents are obtained for example by using as monomers of group (b) hydroxyalkyl esters of ethylenically unsaturated $C_3$–$C_5$-carboxylic acids and not less than dihydric saturated $C_2$–$C_6$-alcohols or polyalkylene glycols, vinyl esters of saturated $C_1$–$C_4$-carboxylic acids, ethylenically unsaturated $C_3$–$C_5$-carboxylic acids, acrylamides, methylpropanesulfonic acids, vinylphosphonic acid, vinylsulfonic acid, esters of ethylenically unsaturated $C_3$–$C_5$-carboxylic acids and monohydric $C_1$–$C_{18}$-alcohols and also di-$C_1$–$C_3$-alkylamino-$C_2$–$C_6$-alkyl acrylates and di-$C_1$–$C_3$-alkylamino-$C_2$–$C_6$ alkyl methacrylates alone or in the form of mixtures of 2 or more of the monomers mentioned in this group.

Suitable monomers of group (b) are specifically the following compounds: hydroxyethyl acrylate, hydroxypropyl acrylate, hydroxybutyl acrylate, hydroxyethyl methacrylate, hydroxypropyl methacrylate, hydroxybutyl methacrylate, monoethylene glycol maleate, the diester of maleic acid and ethylene glycol, monoesters of maleic acid with propylene glycol, monoesters of fumaric acid derived from ethylene glycol or propylene glycol, diesters of maleic acid derived from propylene glycol, diesters of fumaric acid with ethylene glycol, monoesters of acrylic acid and polyethylene glycols from 200 to 9,000 in molecular weight, methacrylic esters of polyethylene glycols from 600 to 4,000 in molecular weight, methacrylic esters of polyethylene glycols from 200 to 9,000 in molecular weight, vinyl formate, vinyl acetate, vinyl propionate, vinyl butyrate, acrylic acid, methacrylic acid, itaconic acid, fumaric acid, citraconic acid, acrylamidomethylpropanesulfonic acids, vinylphosphonic acid, vinylsulfonic acid, acrylic esters of monohydric $C_1$–$C_{18}$-alcohols, e.g. methyl acrylate, ethyl acrylate, n-propyl acrylate, isopropyl acrylate, n-butyl acrylate, isobutyl acrylate, tert-butyl acrylate, 2-ethylhexyl acrylate or stearyl acrylate, and also the monoesters and diesters of maleic acid with monohydric $C_1$-$C_{18}$-alcohols, e.g. monomethyl maleate, dimethyl maleate, monoethyl maleate, diethyl maleate, monopropyl maleate, dipropyl maleate, monotert-butyl maleate, ditert-butyl maleate, monomethyl fumarate, dimethyl fumarate, monotert-butyl fumarate, di-tert-butyl fumarate, monomethyl itaconate, dimethylaminoethyl acrylate, dimethylaminoethyl methacrylate, diethylaminoethyl acrylate, diaminoethyl methacrylate, dipropylaminoethyl acrylate, dipropylaminoethyl methacrylate, dimethylaminoneopentyl acrylate and dimethylaminoneopentyl methacrylate.

Of the monomers of group (b), preference is given to using hydroxyethyl acrylate, hydroxypropyl acrylate, hydroxybutyl acrylate, hydroxyethyl methacrylate, hydroxypropyl methacrylate, hydroxybutyl methacrylate, vinyl acetate, vinyl propionate, dimethyl fumarate, di-tert-butyl maleate, acrylamido-2-methylpropanesulfonic acid, acrylic acid, methacrylic acid and vinylphosphonic acid. The monomers of group (b) are preferably used in an amount from 1 to 10% by weight, based on the monomer mixture used in the polymerization.

The copolymerization of monomers (a) and (b) can additionally be carried out in the presence of monomers (c), which are used in an amount of up to 10% by weight, based on the monomer mixture of (a), (b) and (c), and which comprise crosslinkers containing not less than 2 ethylenically unsaturated double bonds.

Suitable crosslinkers of this kind are for example diacrylates and dimethacrylates of not less than dihydric saturated alcohols, for example ethylene glycol diacrylate, ethylene glycol dimethacrylate, 1,2-propylene glycol diacrylate, 1,2-propylene glycol dimethacrylate, butanediol 1,4-diacrylate, butanediol 1,4-dimethacrylate, hexanediol diacrylate, hexanediol dimethacrylate, neopentylglycol diacrylate, neopentylglycol dimethacrylate, 3-methylpentanediol diacrylate and 3-methylpentanediol dimethacrylate. It is also possible to use the acrylic and methacrylic esters of alcohols having more than 2 OH groups as crosslinkers, e.g. trimethylolpropane triacrylate or trimethylolpropane trimethacrylate. A further class of crosslinkers comprises diacrylates and dimethacrylates of polyethylene glycols and polypropylene glycols each from 200 to 9,000 in molecular weight. Polyethylene glycols and polypropylene glycols which are used for preparing the diacrylates or dimethacrylates preferably have a molecular weight of in each case from 400 to 2,000. Beside the homopolymers of ethylene oxide and propylene oxide respectively, it is also possible to use block and random copolymers of ethylene oxide and propylene oxide. Even oligomers of ethylene oxide or propylene oxide are suitable for preparing the crosslinkers, e.g. diethylene glycol diacrylate, diethylene glycol dimethacrylate, triethylene glycol diacrylate, triethylene glycol dimethacrylate, tetraethylene glycol diacrylate and/or tetraethylene glycol dimethacrylate. Suitable crosslinkers also include vinyl esters of ethylenically unsaturated $C_3$-$C_6$-carboxylic acids, e.g. vinyl acrylate, vinyl methacrylate or divinyl itaconate. Suitable crosslinkers also include vinyl esters of saturated carboxylic acids containing not less than 2 carboxyl groups and also divinyl and polyvinyl ethers of not less than dihydric alcohols, e.g. vinyl adipate, butanediol divinyl ether or trimethylolpropane trivinyl ether. Further crosslinkers are allyl esters of ethylenically unsaturated carboxylic acids, for example allyl acrylate and allyl methacrylate, allyl ethers of polyhydric alcohols, for example pentaerythritol triallyl ether, triallylsucrose and pentaallylsucrose. Suitable crosslinkers also include methylenebisacrylamide, methylenebismethacrylamide, divinylethyleneurea, divinylpropyleneurea, divinylbenzene, divinyldioxane, tetraallylsilane and tetravinylsiane.

The crosslinkers can be used in the copolymerization of maleic anhydride either alone or in the form of mixtures. If crosslinkers are present in the copolymerization, they are preferably used in an amount from 0.2 to 5% by weight, based on the monomer mixture of (a), (b) and (c). Preferred crosslinkers are diacrylates and dimethacrylates derived from polyethylene glycols and/or polypropylene glycols from 400 to 2,000 in molecular weight.

The polymerization initiator used according to the invention is the peroxyester derived formally either from a saturated or an ethylenically unsaturated carboxylic acid. The primary esters of peracids are prepared in general by reacting barium salts of primary alkyl hydroperoxides with acyl chlorides, while the tertiary alkyl esters of peracids are obtainable by simultaneous addition of dilute alkalis and acyl chloride to tertalkyl hydroperoxides. The carboxylic acid moiety in the peroxyester molecule is derived from a saturated $C_1$-$C_{18}$-carboxylic acid or from an ethylenically unsaturated $C_3$-$C_{18}$-carboxylic acid, preferably from a saturated or ethylenically unsaturated carboxylic acid of 4 to 10 carbon atoms. The peroxyesters which come into consideration can be represented in a simplified form by means of the following formulae:

and

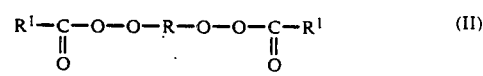

In the formulae I and II, $R^1$ is saturated $C_1$-$C_{17}$-alkyl or aryl, H or ethylenically unsaturated $C_2$-$C_{17}$-alkenyl, which may be substituted by carboxyl. The substituent R in the formula I is a $C_3$-$C_{22}$-alkyl or alkyl having one or more aromatic substituents, for example cumyl. In the formula I R is preferably tert-butyl or tert-amyl. In the formula II, R is preferably $C_2$-$C_{22}$-alkylene.

Examples of possible alkyl or aralkyl peroxyesters of carboxylic acids are cumyl perneodecanoate, tert-butyl perneodecanoate, tert-amyl perneodecanoate, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, 2,5-dimethylhexane 2,5-diperbenzoate and tert-butyl per-3,5,5-trimethylhexanoate. The alkyl peresters mentioned can be used in the polymerization either alone or in a mixture. Preference is given to using tert-butyl perpivalate, tert-butyl per-2-ethylhexanoate or tert-butyl perbenzoate as sole initiators or mixed with each other or with other alkyl peroxyesters. Based on the monomers (a), (b) and facultatively (c) used in the polymerization, from 1 to 20, preferably from 5 to 16, % by weight of peroxyester is used.

The water-soluble copolymers of maleic acid are prepared in two stages. In a first stage, maleic anhydride is copolymerized with a monomer (b) at from 60° to 200° C. in an aromatic hydrocarbon in the presence of one of the abovementioned peroxyesters. If it is desired to broaden the molecular weight of the copolymer, the copolymerization of maleic anhydride and monomer (b) is additionally carried out in the presence of the crosslinker (c). The concentration of monomers (a), (b) and facultatively (c) in the solution of the aromatic hydrocarbon ranges from 20 to 80, preferably from 30 to 70, % by weight. The copolymerization is preferably carried out within the temperature range from 80° to 150° C. In the case of smaller batches, where the resulting heat of polymerization is easily dissipable, it is possible to subject a solution of maleic anhydride and one or more monomers (b) and facultatively (c) in the aromatic hydrocarbon to copolymerization by adding a peroxyester and heating to a temperature within the stated temperature range. It is more advantageous, however, to introduce a solution of maleic anhydride, monomer (b) and facultatively monomer (c) in one or more aromatic hydrocarbons in a reactor initially, to heat the mixture to the temperature required for the polymerization, to heat the peroxyester, dissolved in an aromatic solvent, to a temperature within the above-stated range, and then to add monomers (a), (b) and, if used, (c) continuously or batchwise at a rate commensurate with the rate of polymerization.

However, the polymerization can also be carried out by heating a portion of the mixture to be polymerized, for example from 5 to 10% of the total amount of monomer, to a temperature within the range from 60° to 200° C. in a polymerization reactor, so that the polymerization starts, and then adding the remainder of the components to be polymerized either in the form of a mixture (mixture of maleic anhydride, monomer (b), and facultatively monomer (c) and peroxyester, dissolved in an aromatic hydrocarbon) or separate solutions of maleic anhydride, monomer (b) and facultatively monomer (c) and solutions of one or more peroxyesters in an aromatic hydrocarbon, continuously or batchwise to the hot, initially introduced mixture at polymerization temperature. The copolymerization is preferably carried out under an inert gas atmosphere, for example under nitrogen. To dissipate the heat produced in the course of the copolymerization, the technically most simple solution comprises effecting the polymerization at the boiling point of the aromatic solvent, since the heat of polymerization can then be removed from the system with the aid of evaporative cooling. The use in the polymerization of a mixture of a plurality of aromatic hydrocarbons makes it possible to set suitable polymerization temperatures. Another way of carrying out the polymerization at the boiling point of the specific aromatic hydrocarbon used, or at the boiling point of a mixture of aromatic hydrocarbons, comprises employing reduced or superatmospheric pressure for the copolymerization, depending on the desired polymerization temperature. As well as the batchwise copolymerizations described above, the process can also be carried out continuously to produce larger amounts of copolymer. Continuous copolymerization requires in most cases a cascade of 2 or more polymerization reactors connected in series. The first two reactors in a continuous process are continuously charged with monomer feeds of different compositions and with the peroxyester. Here it is also possible to charge all the monomer to the first reactor and distribute the initiator quantities required over 2 or 3 reactors.

To prepare a copolymer having a particularly low residual monomer content (in particular as regards maleic anhydride), the main polymerization can be followed by a postpolymerization which is carried out either at the same temperature as the main polymerization or at a temperature from about 10° to 40° C. higher. Preferably, the postpolymerization likewise employs peroxyester. A total amount from 1 to 20% by weight of peroxyester is required for the main and the postpolymerization. In the main polymerization, either all of the peroxyester is used and then the postpolymerization carried out, or initially from 80 to 95% of the amount of initiator required is used in the main polymerization and, after the main polymerization has been completed, the remainder is added and the postpolymerization carried out at a higher temperature.

The conversion of maleic anhydride when, in accordance with the invention, a peroxyester initiator is used is above 99%, so that copolymers of maleic anhydride are obtained containing less than 1% by weight of unpolymerized maleic anhydride. From the mass balance of the copolymerization, the elemental analysis of the copolymer and IR spectra it is possible to infer that the copolymer contains not only, as copolymerized units, maleic anhydride and monomers (b) and facultatively (c), but also, in a bonded form, decomposition products of the peroxyester and the structural elements of the particular aromatic hydrocarbon used. Based on maleic acid in the copolymer, up to 75, preferably from 10 to 65, % by weight of aromatic hydrocarbon and decomposition products of peroxyester are incorporated in the copolymer on the assumption of a 100% conversion of maleic anhydride to polymaleic anhydride.

The copolymerization of maleic anhydride according to the invention produces, depending on the choice of solvent, clear polymer solutions, precipitates of copolymer, or even two separate phases each containing copolymer, of which the bottom phase has an oily consistency at above 90° C. and solidifies on cooling down. The top phase consists essentially of a solution containing the polymer. The polymers present in the two different phases have different application properties. However, they can be used together for the same application, so that there is no need to separate the polymers. However, the two organic phases can also be separated, so that fractionation of the copolymers is possible in the context of the process of preparation. By separating the phases and fractionating the copolymerization product it is possible to produce particularly effective water treatment agents. The aromatic hydrocarbons not incorporated in the polymer in the course of the copolymerization can be recovered and reused, even without purification, in a subsequent copolymerization. The copolymerization of maleic anhydride in the process according to the invention is carried out in the absence of water. The aromatic hydrocarbons used in the copolymerization are virtually anhydrous, containing not more than 0.2% by weight of water, i.e. a water content which, on contact between water and aromatic hydrocarbon, dissolves therein.

In a second process stage, the products obtainable in the copolymerization are hydrolyzed. To this end it is possible, if in the copolymer to be prepared the carboxyl groups are to be present in the acid form, to add water and to heat the reaction mixture to up to 150° C., preferably 70°–100° C., to complete the hydrolysis of the anhydride groups of the copolymer. If the hydrolysis of the copolymer is carried out at temperatures above the boiling point of the solvent-water mixture, superatmospheric pressure is employed. The aromatic hydrocarbon used in the copolymerization can be distilled out of the resulting aqueous polymer solution before or after the hydrolysis. However, the copolymer can also be precipitated from the reaction mixture obtained in the course of the polymerization by addition of a solvent in which the copolymer is not soluble, and then be hydrolyzed.

If desired, the aqueous solution of the copolymer can also be treated with a base, so that the carboxyl groups of the copolymer are then wholly or partly present in the salt form. Suitable bases are for example sodium hydroxide solution, potassium hydroxide solution, ammonia and amines. However, the preferred way of preparing the copolymer in salt form comprises neutralizing the reaction mixture from the copolymerization with an aqueous solution of an alkali metal base, ammonia or an amine. In this case too, the aromatic hydrocarbon can be distilled off before, during or after the neutralization and subsequently be reused. Aside from an alkali metal base, it is also possible to use an aqueous solution of ammonia or of an amine, for example triethylamine, butylamine, ethanolamine, triethanolamine or morpholine. In those cases where the acid form of the hydrolyzed copolymer is not soluble in water, the copolymer is converted into a water-soluble form by partial or complete neutralization with a base.

The K value of the copolymer described above ranges from 7 to 20, preferably from 8.5 to 15 (determined as sodium salt in a 5% strength aqueous solution at 25° C. and pH 7). After hydrolysis, the copolymer contains less than 1% by weight of monomeric maleic acid (determined by polarography). The aqueous solution of the hydrolyzed copolymer can therefore be used directly, without further purification, as a water treatment agent to reduce or completely prevent scale and water hardness deposits in water-conducting systems.

The copolymerization can be carried out in the presence of protective colloids and polymerization regulants. Suitable protective colloids, which ultimately lead to clear aqueous copolymer solutions, are for example polymers which are not only readily soluble in the organic solvent but also somewhat soluble in water. Protective colloids which have these properties are for example polyvinyl ethers, e.g. polymers of $C_1$–$C_4$-alkyl vinyl ethers. Protective colloids of this type are known and range in K value for example from 30 to 80 (determined by the method of Fikentscher in cyclohexanone at 25° C. for a polymer concentration of 1%). If used in the copolymerization, protective colloids are used in amounts from 0.2 to 2% by weight, based on the total amount of monomer (a), (b) and (c).

To reduce the molecular weight of the copolymer, a regulant may be used in the polymerization. A regulant is for example a compound such as mercaptoacetic acid, mercaptopropionic acid, dodecylmercaptan or a mercaptoalkanol, such as 2-mercaptoethanol, mercaptopropanols or mercaptobutanols. If a regulant is used, it is used in amounts from 0.1 to 5% by weight, based on the monomers used in the copolymerization.

The action of the copolymer as an antiscalant consists in preventing the formation of crystals of the hardness-forming salts, such as calcium carbonate, magnesium oxide, magnesium carbonate, calcium sulfate, barium sulfate, strontium sulfate, calcium phosphate (apatite) and the like, in the substoichiometric dosage range, or to influence formation of these precipitates in such a way as to prevent hard and stony coatings being formed, producing instead readily deflocculable, fine particles in the water. In this way the surfaces of, for example, heat exchangers, pipes or pump parts are kept free of scale deposits and the corrosive action thereof is reduced. More particularly, the risk of pitting corrosion underneath these scale deposits is reduced. Furthermore, the growth of microorganisms on these metal surfaces is made more difficult. By using an antiscalant, the life of such plants can be extended and stoppage times for cleaning plant components substantially reduced. The amount of antiscalant required for this purpose only ranges from 0.1 to 100 ppm, based on the particular water quantity. Water-conducting systems are for example open or closed cooling cycles, for example in power stations, or chemical installations, such as reactors, distillation apparatus and the like, where heat needs to be removed. The antiscalant can also be used in boiler waters and steam generators, preferably within the range of water temperatures below 150° C. A preferred use for the antiscalant to be used according to the invention, furthermore, is in the demineralization of sea water, brackish water by distillation or membrane processes, e.g. reverse osmosis or electrodialysis. For instance, in the MSF distillation process for desalinating sea water, concentrated sea water is recycled at elevated temperature. If present therein, the antiscalant is effective in preventing the deposition of hardness formers, e.g. brucite, and the caking thereof to plant components.

In membrane processes, damage to the membranes by the crystallization thereon of hardness formers can be effectively prevented. In this way, these antiscalants make possible higher concentration factors, improved yields of pure water, and longer membrane lives. A further use of the antiscalant is for example in the evaporation of sugar juices from cane and beet sugar. Unlike the uses described above, in this case for example calcium hydroxide, carbon dioxide, sulfur dioxide or, if appropriate, phosphoric acid is added to the thin sugar juice to effect purification. After filtration, sparingly soluble calcium salts remaining in the sugar juice, e.g. calcium carbonate, sulfate or phosphate, then precipitate in the course of the process of evaporation and can appear as rock-hard deposits on heat exchanger surfaces. In a similar manner this also applies to other substances in the sugar, such as silica or calcium salts of organic acids, for example of oxalic acid.

The same is true of processes which follow the sugar recovery process, for example recovery of alcohol from residues of sugar production.

The copolymer usable according to the invention as antiscalant is capable of substantially preventing the abovementioned scale deposition processes, so that stoppage times for cleaning plants, for example by boiling out, can be significantly shortened. A further essential aspect in this connection is the substantial energy saving realized through avoidance of the heat-insulating deposits mentioned.

The amount of antiscalant required in the uses mentioned varies, but ranges from 0.1 to 100 ppm, based on the amount of cooling water, boiler water, process water or, for example, sugar juice.

The hydrolyzed copolymer of maleic acid can also be incorporated as an incrustation and grayness inhibitor in an amount from 0.5 to 10% by weight in washing agent formulations. The water-soluble copolymer is also useful as a water hardness stabilizer in detergent formulations. It is also suitable in an amount of from 0.1 to 5% by weight as a dispersant for pigments, for example for producing highly concentrated aqueous slurries of clay or chalk for use in paper-coating compositions.

In the Examples, the parts and percentages are by weight. The K values of the hydrolyzed copolymers were determined by the method of H. Fikentscher, Cellulose-Chemie, 13 (1932) 48–64 and 71–74, in aqueous solution at pH 7 and at 25° C. with the sodium salt of the copolymer present in a concentration of 5% by weight.

EXAMPLE 1

A 2-l capacity glass reactor equipped with stirrer, thermometer, nitrogen inlet, condenser, add vessels and means of passing in steam is charged with a solution of 380 g of maleic anhydride in 600 g of dry o-xylene and heated to reflux. In the course of 3 hours from the start of refluxing, the reactor is charged with an add 1 comprising a solution of 8 g of hydroxypropyl acrylate in 8 g of o-xylene and in the course of 5 hours from the start of refluxing with an add 2 comprising a solution of 86 g of tert-butyl per-2-ethylhexanoate in 100 g of o-xylene. The polymerization under reflux is carried out with thorough mixing of the reactants. After add 2 has been added, the reaction mixture is heated at the boil for a further hour, then cooled down to 97° C. and hydrolyzed by addition of 300 g of water. Steam is then passed into the reaction mixture, and the unconverted o-xylene is removed azeotropically from the reaction mixture to leave a clear, brownish aqueous solution having a solids content of 75.2%. The maleic acid and hydroxypropyl acrylate copolymer thus obtained has, in the form of the sodium salt, a K value of 9.5 under the abovementioned conditions. The unpolymerized maleic acid content in the copolymer is 0.9%. The yield of copolymer, based on the monomers used in the copolymerization, is 123%.

EXAMPLE 2

The apparatus described in Example 1 is charged with a solution of 400 g of maleic anhydride in 580 g of o-xylene, the solution is heated to the boil under reflux, an add 1 comprising a solution of 20 g of hydroxypropyl acrylate in 20 g of o-xylene is added in the course of 3 hours from the start of refluxing, and an add 2 comprising a solution of 60 g of tert-butyl per-2-ethylhexanoate in 100 g of o-xylene is added in the course of 5 hours. The copolymerization is carried out under reflux and with thorough mixing of the reactants. After add 2 has been added, the reaction mixture is heated under reflux for a further hour. As soon as the stirrer is switched off, the mixture separates into two phases. After the reaction mixture has been cooled down to about 95° C., 300 g of water are added to hydrolyze the anhydride groups of the copolymer, and steam is then passed into the reaction mixture to remove the unconverted o-xylene azeotropically, leaving an almost clear, brownish solution having a solids content of 57.2%. The K value of the copolymer is 10.4 and the copolymer yield 129%, based on the monomers used. The residual monomer content of the copolymer is 0.23%.

EXAMPLE 3

The polymerization apparatus described in Example 1 is charged with a solution of 380 g of maleic anhydride in 600 g of o-xylene. The solution is heated to the boil under reflux, and 20 g of hydroxyethyl acrylate are metered in over a period of 3 hours from the start of refluxing and an add 2 comprising a solution of 60 g of tert-butyl per-2-ethylhexanoate in 100 g of o-xylene in the course of 5 hours from the start of boiling. On completion of the addition of initiator, the reaction mixture is refluxed for a further hour to reduce the residual monomer content. The reaction mixture is cooled to 98° C., 300 g of water are added to hydrolyze the anhydride groups of the copolymer, and subsequently a steam distillation is carried out to remove the unconverted o-xylene azeotropically with water, leaving an almost clear brown solution having a solids content of 56.9%. The copolymer thus obtained has a K value of 9.6 and a maleic acid content of 0.16%. The yield of copolymer is 126%, based on maleic acid and hydroxyethyl acrylate.

EXAMPLE 4

Example 1 is repeated, except that add 1 comprises 32 g of butanediol monoacrylate. An almost clear brown solution having a solids content of 50.9% is obtained. The copolymer has a K value of 10.3 and a residual maleic acid content of 0.06%. The yield of copolymer, based on maleic acid and butanediol monoacrylate, is 124%.

EXAMPLE 5

The apparatus described in Example 1 is charged with a solution of 360 g of maleic anhydride in 600 g of o-xylene, and the solution is heated to the boil under reflux. With the start of refluxing an add 1 comprising 40 g of vinyl acetate and an add 2 comprising 60 g of tert-butyl per-2-ethylhexanoate in 100 g of o-xylene are run in over 4 hours. On completion of the initiator add, the reaction mixture is subsequently refluxed for a further hour to complete the polymerization. The reaction solution is then cooled down to 98° C., 300 g of water are added, and steam is then passed through the reaction mixture. The azeotropic removal of the o-xylene leaves a clear brown solution having a solids content of 63.3%. The copolymer has a K value of 9.6 and contains 0.01% of unpolymerized maleic acid. The yield of copolymer is 120%, based on maleic acid and vinyl acetate.

EXAMPLE 6

Example 5 is repeated, except that add 1 comprises 40 g of vinyl propionate. An almost clear brown aqueous solution having a solids content of 63.6% is obtained. The copolymer has a K value of 9.6 and contains 0.36% of monomeric maleic acid. The yield of copolymer is 121%, based on maleic acid and vinyl propionate.

EXAMPLE 7

The apparatus described in Example 1 is charged with a solution of 360 g of maleic anhydride, 40 g of dimethyl fumarate and 600 g of o-xylene, and the solution is heated to the boil under reflux. With the onset of refluxing, a solution of 60 g of tert-butyl per-2-ethylhexanoate in 100 g of o-xylene is added continuously. On completion of the initiator add, the reaction mixture is heated at the boil for a further hour and then cooled down to 97° C., whereafter 300 g of water are added. A steam distillation is then carried out to remove the unconverted o-xylene, leaving an almost clear brown solution having a solids content of 61.5%. The copolymer has a K value of 9.5 and contains 0.35% of monomeric maleic acid. The yield of copolymer is 121%, based on maleic acid and methyl fumarate.

EXAMPLE 8

Example 7 is repeated, except that the polymerization apparatus is charged with a solution of 360 g of maleic anhydride and 40 g of di-tert-butyl maleate in 600 g of o-xylene. A clear brown solution having a solids content of 60.1% is obtained. The copolymer has a K value of 9.4 and contains 0.6% of maleic acid. The yield of copolymer is 117%, based on maleic acid and tert-butyl maleate.

EXAMPLE 9

Example 7 is repeated, except that the solution charged to the polymerization apparatus now comprises 360 g of maleic anhydride and 40 g of acrylamidomethylpropanesulfonic acid in 600 g of o-xylene. An aqueous solution having a solids content of 60.8% is obtained. The copolymer has a K value of 9.5 and contains 0.98% of maleic acid. The yield is 115%, based on maleic acid and the comonomer.

EXAMPLE 10

Example 7 is repeated, except that the polymerization apparatus is charged with a solution of 360 g of maleic anhydride and 40 g of methacrylic acid in 600 g of o-xylene. A clear brownish solution having a solids content of 65.7% is obtained. The copolymer has a K value of 13.5% and contains 0.6% of maleic acid. The yield is 122%, based on maleic acid and methacrylic acid.

EXAMPLE 11

The polymerization apparatus described in Example 1 is charged with a solution of 360 g of maleic anhydride in 832 g of a technical-grade xylene mixture, and the solution is heated with stirring to 100° C. As soon as this temperature is reached, 40 g of acrylic acid in 100 g of a technical-grade xylene mixture are continuously metered in over 3 hours and a solution of 30 g of tert-butyl per-2-ethylhexanoate in 100 g of a technical-grade xylene mixture is continuously metered in over 5 hours. The polymerization temperature is maintained at 100° C. On completion of the initiator add, the reaction mixture is refluxed for a further hour. A clear yellow solution having a solids content of 56.3% is obtained. The copolymer has a K value of 9.5 and contains 0.96% of maleic acid. The yield of copolymer is 156%, based on maleic acid and acrylic acid.

EXAMPLE 12

The polymerization apparatus described in Example 1 is charged with a solution of 360 g of maleic anhydride and 40 g of vinylphosphonic acid in 932 g of a technical-grade xylene mixture, and the temperature is raised to 100° C. As soon as this temperature is reached, a start is made on the addition of the initiator, while the reaction mixture is stirred uninterruptedly. The initiator comprises a solution of 30 g of tert-butyl per-2-ethylhexanoate in 100 g of a technical-grade xylene mixture. The initiator is added continuously over 5 hours. Thereafter the reaction mixture is refluxed at the boil for a further hour and then cooled down to 95° C., treated with 300 g of water and subjected to a steam distillation. A clear yellow solution having a solids content of 50.5% is obtained. The copolymer has a K value of 9.3 and contains 0.98% of maleic acid. The yield is 153%, based on maleic acid and vinylphosphonic acid.

EXAMPLE 13

The polymerization apparatus described in Example 1 is charged with a solution of 368 g of maleic anhydride in 570 g of o-xylene, the solution is raised to the boil, and an add 1 comprising a mixture of 20 g of hydroxypropyl acrylate and 12 g of butanediol diacrylate and an add 2 comprising a solution of 60 g of tert-butyl per-2-ethylhexanoate in 100 g of o-xylene are run in continuously and simultaneously over 3 hours and 5 hours respectively. The polymerization is carried out with stirring and under reflux. After the initiator has been added, the reaction mixture is boiled under reflux for a further hour, cooled down to 98° C., treated with 500 g of water and subjected to a steam distillation. A clear brownish aqueous solution having a solids content of 50.6% is obtained. The resulting, slightly crosslinked copolymer has a K value of 12.1 and contains 0.17% of maleic acid. The yield of copolymer is 123%, based on the monomers used in the copolymerization.

COMPARATIVE EXAMPLE 1

(Corresponding to Example 8 of U.S. Pat. No. 3,755,264)

A 2-1 capacity glass reactor equipped with stirrer, inflow means, reflux condenser and a device for passing in steam was charged with a solution of 300 g of maleic anhydride in 330 g of toluene, and the solution was heated to the boil under reflux. With the onset of boiling an add comprising a solution of 30 g of vinyl acetate and 32 g of benzoyl peroxide (75% strength) in 210 g of toluene was continuously metered in over 4 hours. After addition was complete, the reaction mixture was heated at the boil for a further half hour, and then cooled down to 97° C., treated with 200 g of water and subjected to a steam distillation to remove the toluene. On completion of the polymerization, the reaction mixture separated into 2 phases. The upper phase was cloudy with a dark brown color, while the lower phase had a black color and an oily consistency. The aqueous solution obtained on steam distillation had a reddish brown color and a solids content of 55.9%. The maleic acid copolymer contained 46.1% of monomeric maleic acid. On account of this high maleic acid content, no applications testing was carried out.

COMPARATIVE EXAMPLE 2

(in Accordance with German Laid-Open Application DE-OS 2,643,422, page 21, copolymer E)

No details concerning the preparation of the copolymer are given in said DE-OS. The copolymerization was therefore modeled on the Examples of the present invention:

The polymerization apparatus described in Example 1 was used, a solution of 101.4 g of maleic anhydride in 400 g of o-xylene was introduced initially, and raised to the boil, and then add 1, comprising a solution of 120 g of hydroxyethyl methacrylate and 120 g of acrylic acid in 100 g of o-xylene and an add 2 comprising a solution of 60 g of tert-butyl perethylhexanoate in 100 g of o-xylene were then run in continuously and simultaneously in the course of 3 hours and 5 hours respectively, while the polymerization was carried out at the boiling point of o-xylene. Immediately after the comonomers had been added a coating formed on the walls. After 1 ½ hours the batch comprised a thickish polymer paste. After the initiator had been added, the reaction mixture was heated at the boil for a further hour to effect postpolymerization, then cooled down to 98° C., treated with 250 g of water and subjected to a steam distillation to remove o-xylene. During the distillation a further 400 g of water were added. A pasty slurry of a water-insoluble copolymer was obtained. On addition of 50% strength aqueous sodium hydroxide solution to the reaction mixture to pH 8, only a small amount of copolymer proved soluble. The bulk of the copolymer remained undissolved. Such a product is not usable for water treatment. A similar result is obtained if the polymerization initiator used for preparing copolymer E comprises 60 g of tert-butyl peroxide.

APPLICATION EXAMPLES

Test Methods

Dynamic Inhibition of CaCO3

This test simulates scale formation by calcium carbonate in a cooling cycle. In this test, test water of 30° German Ca hardness, 10° German Mg hardness and 56° German carbonate hardness is pumped for 2 h through a hot glass spiral at 75° C. at a flow rate of 0.5 l/h. The scale deposit formed in the spiral is dissolved off and Ca+Mg is determined complexometrically. The inhibitor action is calculated from the amount of scale formed in the blank test and in the presence of corresponding amounts of antiscalant.

Dispersing of Ca Phosphate

This test can be used to determine the dispersing action of precipitates. In this test, test water giving a 500 ppm calcium phosphate precipitate at pH 8.5-9 is maintained at 100° C. for 1 hour and subsequently transferred to a cylinder. After 1 h the Ca content in the center of the cylinder is determined coplexometrically. The dispersing action is calculated from the amount of dispersed calcium phosphate in the blank test and in the presence of the dispersant.

Sea Water Desalination Screening Test

Substitute sea water (200 ml) as defined in German Standard Specification DIN 50,900 (1960), having an initial salt concentration of 6.15%, is evaporated at 95° C. until cloudiness appears. The volume obtained is a measure of the effectiveness of the antiscalant.

The copolymers prepared in Examples 1 to 13 were tested by the methods described above. The table below shows the results obtained:

TABLE

| ppm of 100% pure copolymer: | Ca carbonate inhibition (%) 2 | Ca phosphate dispersal (%) 30  45  60 | Sea water evaporation (Mg oxide inhibition) (ml of volume remaining) 0.25 | 0.5 | 1.0 |
| --- | --- | --- | --- | --- | --- |
| Example No. | | | | | |
| 1 | 81.1 | 32.5/65.3/78.0 | — | 116 | — |
| 2 | 76.1 | 88.5/98.4/99.7 | 135 | 90 | 65 |
| 3 | 78.3 | 35.6/86.5/98.2 | 142 | 112 | 73 |
| 4 | 74.4 | 44.8/73.6/92.6 | 138 | 116 | 72 |
| 5 | 76.7 | 42.7/78.2/89.8 | — | 118 | — |
| 6 | 76.1 | 65.3/88.9/91.5 | 142 | 110 | 76 |
| 7 | 78.9 | 22.2/72.8/91.7 | — | 114 | — |
| 8 | 80.0 | 67.7/83.1/88.8 | 141 | 115 | 78 |
| 9 | 78.9 | 25.6/62.8/81.7 | — | 114 | — |
| 10 | 75.5 | 44.6/72.3/90.2 | 132 | 112 | 69 |
| 11 | 69.5 | 52.0/70.4/82.5 | 144 | 119 | 66 |
| 12 | 69.0 | 23.0/68.9/86.6 | 145 | 122 | 79 |
| 13 | 81.2 | 72.0/87.8/95.8 | 148 | 104 | 76 |
| Comparative example Polymer according to Example 1 of U.S. Pat. No. 3,810,834 | 63.2 | 5.6/55.8/69.6 | 148 | 131 | 84 |

We claim:
1. A process for preventing the deposition of hardness formers in water-conducting systems, comprising: adding to said water-conducting system a deposition preventing copolymer in an amount effective to prevent deposition of hardness formers, said deposition preventing polymer prepared by the process of copolymerizing (a) from 99 to 80% by weight of maleic anhydride and (b) from 1 to 20% by weight of a monoethylenically unsaturated monomer copolymerizable therewith, the percentages (a) and (b) always adding up to 100, at from 60° to 200° C. in an aromatic hydrocarbon in the presence of from 1 to 20% by weight, based on the monomers (a) and (b), of a peroxyester polymerization initiator selected from the group consisting of the following formulae

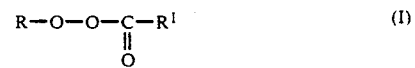 (I)

and

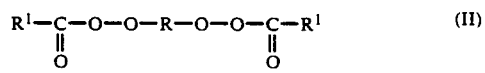 (II)

wherein
$R^1$ is saturated $C_1$–$C_{17}$-alkyl or aryl, H or ethylenically unsaturated $C_2$–$C_{17}$-alkenyl, which may be substituted by carboxyl, and R in the formula I is a $C_3$–$C_{22}$-alkyl or alkyl having one or more aromatic substituents and mixtures thereof so that the conversion of maleic anhydride is above 99%, so that copolymers of maleic anhydride are obtained containing less than 1% by weight of unpolymerized maleic anhydride and hydrolyzing the anhydride groups in the copolymer.

2. A process for preventing the deposition of hardness formers in water-conducting systems, comprising: adding to said water-conducting system a deposition preventing copolymer in an amount effective to prevent deposition of hardness formers, said deposition preventing polymer prepared by the process of copolymerizing (a) from 98 to 90% by weight of maleic anhydride and (b) from 2 to 10% by weight of a monoethylenically unsaturated monomer copolymerizable therewith, the percentages (a) and (b) always adding up to 100, at from 60° to 200° C. in an aromatic hydrocarbon in the presence of a peroxyester polymerization initiator which is tert-butyl per-2-ethylhexanoate and which is present in an amount of from about 5 to 16% by weight based on the total of the weights of (a) and (b), and hydrolyzing the anhydride groups in the copolymer.

3. The process of claim 1 wherein said deposition preventing copolymer is present in said water-conducting system in an amount of from 0.1 to 100 ppm.

4. The process of claim 2 wherein said deposition preventing copolymer is present in said water-conducting system in an amount of from 0.1 to 100 ppm.

* * * * *